Aug. 26, 1969    H. J. MOON    3,462,818
MANUFACTURING METAL LEGS OR THE LIKE WITH ORNAMENTAL FACINGS
Filed June 5, 1967

INVENTOR
Herbert J. Moon
BY
Morsell & Morsell
ATTORNEYS

United States Patent Office 3,462,818
Patented Aug. 26, 1969

3,462,818
MANUFACTURING METAL LEGS OR THE LIKE
WITH ORNAMENTAL FACINGS
Herbert J. Moon, Milwaukee, Wis., assignor to Lakeside Manufacturing, Inc., Milwaukee, Wis., a corporation of Wisconsin
Filed June 5, 1967, Ser. No. 646,793
Int. Cl. B23p 17/00
U.S. Cl. 29—155                                3 Claims

ABSTRACT OF THE DISCLOSURE

A method of making a hollow metal leg of rectangular cross-section having spaced front flanges, there being a metal backing channel welded within each leg in a position spaced inwardly a distance from the front flanges to provide a slot for slidably receiving a strip of laminated decorative plastic sheet material, the backing channel having spaced access openings through which one of the electrodes of a spot welder may be inserted for spot welding the flanges of the backing channel in position prior to sliding the ornamental laminated strip in place.

BACKGROUND OF THE INVENTION

Field of the invention

The present invention pertains to the manufacture of hollow elongated legs or the like formed principally of metal, which legs are particularly adapted for use in carts of the type used in institutions, restaurants, hotels, hospitals and the like.

Description of the prior art

Heretofore legs for carts or the like have been manufactured of round tubular stock, of angle iron, or of hollow tubing which is rectangular in cross-section. The latter legs are necessary in certain carts which require substantial strength. All of these metal legs are more or less unattractive. While laminated decorative plastic material, such as "Formica," has been employed in certain portions of carts for ornamentation, there has been no practical way of ornamenting the legs by the use of such materials, the securing of such laminated material to the metal by means of an adhesive being expensive, time-consuming and unsatisfactory for this type of use.

SUMMARY OF THE INVENTION

The present invention provides a method of making an ornamental leg or the like and method of manufacturing the same, in which the leg is rectangular in shape and has spaced front flanges of metal, which flanges overlap a strip of ornamental laminated sheet material, the latter being slidably received between said metal flanges and a metallic backing member, and the latter providing the required strength.

A further object of the invention is to provide a novel method of manufacturing ornamental elongated members or the like comprising the forming of sheet metal into channel shape with front spaced-apart flanges, the formation of a backing channel of metal sized to fit within the first channel in a position spaced behind the flanges of the latter, the die cutting of longitudinally-spaced access holes in the backing strip, the welding of the backing strip in position in the main channel by insertion of a welding electrode through said holes, and the sliding of the ornamental plastic strip in position between the flanges and backing channel.

BRIEF DESCRIPTION OF THE DRAWING

In the drawings, wherein the same reference numerals designate the same parts in all of the views.

DESCRIPTION OF THE PREFERRED EMBODIMENT

Figure 1:
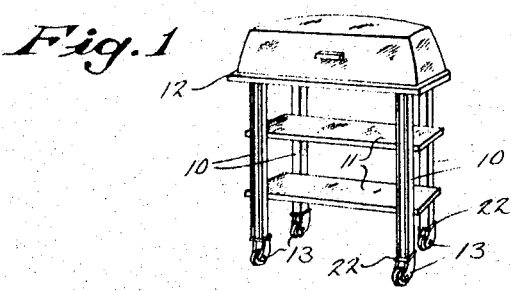
FIG. 1 is a perspective view of a display cart having legs manufactured in accordance with the present invention.

Referring more particularly to the drawings, FIG. 1 illustrates by way of illustration a display cart supported by legs 10 which are formed in accordance with the present invention, said legs supporting horizontal shelves 11 and a top-supporting surface 12, and there being a caster 13 on the lower end of each leg. It is to be understood that the improved hollow, elongated elements may be used for other purposes than for legs, and in carts of types other than that of FIG. 1.

Figure 2:
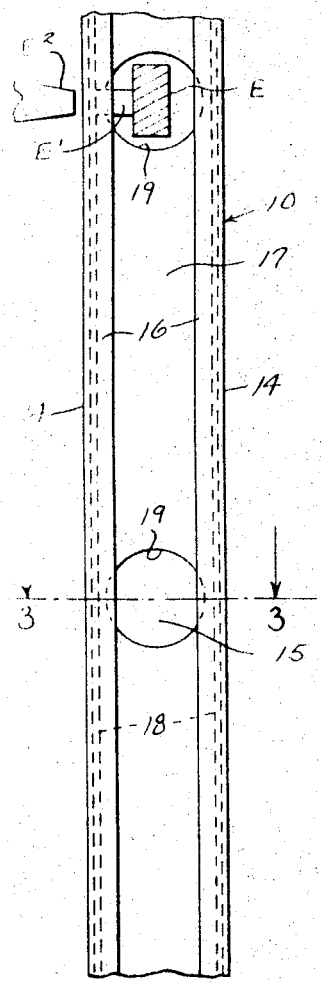
FIG. 2 is a fragmentary elevational view showing the procedure in forming one of said legs prior to the insertion of the decorative strip, the electrodes of a welding apparatus being shown diagrammatically in position in one of the access holes of the backing channel.
Figure 3:
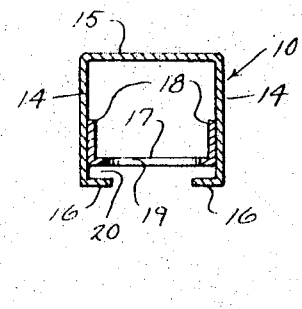
FIG. 3 is a sectional view taken on the line 3—3 of FIG. 2.

Each leg comprises a strip of metal, such as stainless steel, bent to the channel-shape shown in FIG. 3, to provide sides 14, a back 15 and spaced-apart front flanges 16. Backing strips 17 are also formed of metal such as stainless steel and in the channel-shape shown in FIG. 3, with side flanges 18. The spacing between the outer sides of the flanges 18 is such that the backing channels may be slid into position, as shown in FIGS. 2 and 3, in contact with the inner faces of the sides 14 of the outer channel. The backing channels 17 are formed with longitudinally-spaced die-cut access openings 19 which are of a width almost as great as the width of the backing channel. With this novel method of procedure, one electrode E may be inserted in a hole 19 in a position so that its operating projection E' may engage the inner side of a flange 18. Then when the outer electrode $E^2$ is brought into contact with the outer surface of a side 14, as shown in FIG. 2, the flange 18 may be spot welded in position. The welding apparatus is inserted in the holes 19 one after another, first on one side of a hole and then on the other, until both flanges of the backing member have been secured by a series of longitudinally spaced spot welds 9, the longitudinal spacing between spot welds being determined by the longitudinal spacing between the access holes 19. The spot welding is done while the backing channel 17 is in a position so that its outer face is spaced a predetermined distance inwardly from the flanges 16 to thereby provide slots 20 for slidably receiving the edges of the ornamental material, as will be hereinafter described, the inward spacing of the backing channel 17 from the flanges 16 being such with respect to the thickness of the decorative facing material as to freely, slidably, yet snugly, receive said material.

Figure 5:
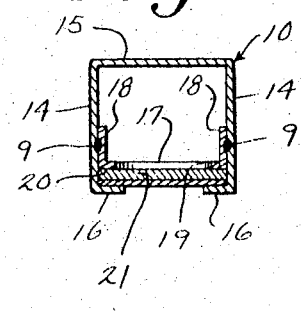
FIG. 5 is a sectional view taken on the line 5—5 of FIG. 4.
Figure 4:
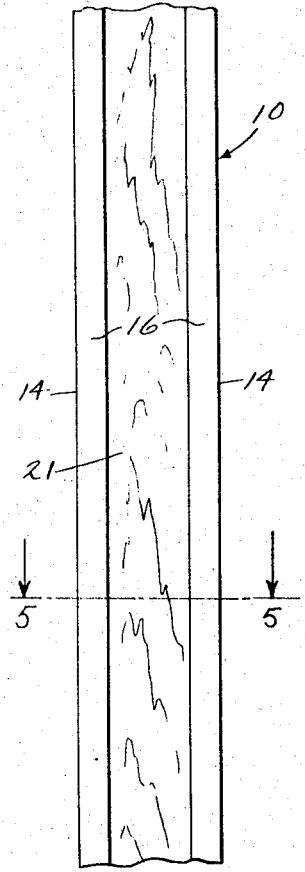
FIG. 4 is a view similar to FIG. 2 after the strip of decorative laminated plastic material has been inserted in position.

Strips of the ornamental material 21 are prepared of a width to be slidably received beneath the flanges 16 and between the side walls 14. Inasmuch as the purpose of these strips is principally for ornamentation, it is preferred to utilize laminated ornamental plastic sheet material, such as a urea resin type or a melamine formaldehyde resin type, having an ornamental pattern such as that of grained wood. After these strips have been prepared they are slid into position, as shown in FIGS. 4 and 5, the fit being such that they will hold themselves in place. However, in most structures, such as the cart of FIG. 1, bottom fittings, such as the caster fittings 22, will prevent downward slidable movement, and the top of the cart will prevent movement in an upward direction.

From the above it may be seen that the improved legs have all of the strength of a four-sided, hollow metal leg because of the strength added by the welded-in-place metal backing channel. It is also apparent that the construction is such that the ornamental strips 21 have their edges overlapped by the metal flanges 16 in a way to dress up the edges of the strips and to cover any roughness from the cutting. At the same time, this novel construction and method make it impossible for the decorative material to loosen, such as might be true where such material is connected to a surface by an adhesive. This improved method of construction is speedy, relatively inexpensive, and makes it possible for very attractive legs to be quickly made by relatively inexperienced workmen.

Various changes and modifications may be made, as well as other adaptations, as may come within the scope of the attached claims, and all of such changes and adaptations are contemplated as may come within the scope of the claims.

What I claim is:

1. A method of manufacturing a strong hollow elongated supporting member which is rectangular in cross-section and which has an ornamental side formed of ornamental sheet material which is devoid of structural strength, comprising bending an elongated strip of sheet metal to form a first portion having an elongated back, two elongated sides, and spaced-apart front flanges which are bent from said sides; cutting an elongated backing strip of a width to fit between said sides of said first portion; securing said strip in position between said sides and spaced a short distance inwardly of said flanges to provide shallow slots between said flanges and backing strip; cutting a strip of thin ornamental sheet material of a thickness to be snugly, but slidably, received in said slots; and sliding said strip endwise into said slots so that it is exposed between said flanges.

2. A method of manufacturing a strong hollow elongated supporting member as claimed in claim 1 which includes the formation of longitudinal flanges on the backing strip and the insertion of the backing strip into position with said flanges projecting inwardly; and in which the securing of the backing strip in position is performed by spot welding of the backing strip flanges to the side walls of the first portion.

3. A method of manufacturing a strong hollow elongated supporting member as claimed in claim 2 which includes the die cutting of spaced access holes in the backing strip and the use of said access holes for accommodating a welding electrode while welding the backing strip flanges to the side walls of the first portion.

References Cited

UNITED STATES PATENTS

| 2,798,284 | 7/1957 | Mudd | 29—155 |
| 2,844,864 | 7/1958 | Schilberg | 29—155 |
| 3,312,028 | 4/1967 | Schroyer | 52—478 |

THOMAS H. EAGER, Primary Examiner

U.S. Cl. X.R.

29—160; 52—478